United States Patent Office 3,143,560
Patented Aug. 4, 1964

3,143,560
POLYMERIC PHENAZASILINES
David Wasserman, Springfield, N.J., and Robert E. Jones, North Muskegon, Mich., assignors to Merck & Co., Inc., Rahway, N.J., a corporation of New Jersey
No Drawing. Filed Aug. 20, 1962, Ser. No. 218,114
6 Claims. (Cl. 260—448.2)

This invention relates to antioxidants for high temperature lubricants and, more particularly, to the synthesis of polymers of diphenylphenazasiline.

Phenazasiline compounds have been found to be useful as antioxidants in high temperature lubricants, particularly those of the synthetic ester type. The compound 5-ethyl-10,10-diphenylphenazasiline, for example, is capable of withstanding temperatures in the range of 400° F. and higher.

An object of this invention is to provide polymeric phenazasiline compounds.

A more specific object of the invention is to provide polysiloxanes containing phenazasiline compounds.

Still another object of the invention is to provide novel compounds which are useful as intermediates in the formation of polysiloxanes containing phenazasiline derivatives.

Among the other objects is to provide methods of synthesis for polymeric phenazasilines.

These and other objects will appear more fully in the description which follows.

According to the present invention there are provided novel polymeric phenazasiline compounds having the general formula:

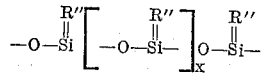

where R''=

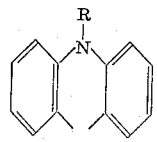

and where X ranges from 1 to 50, novel intermediates having the formula:

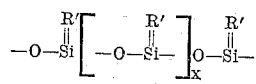

wherein R'=

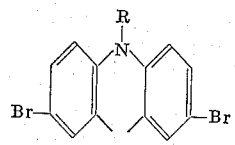

and where X ranges from 1 to 50, and

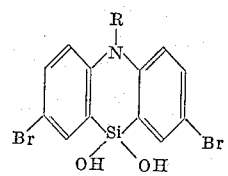

where R is lower alkyl.

The following flow sheet illustrates a process for preparing the novel compounds of the present invention:

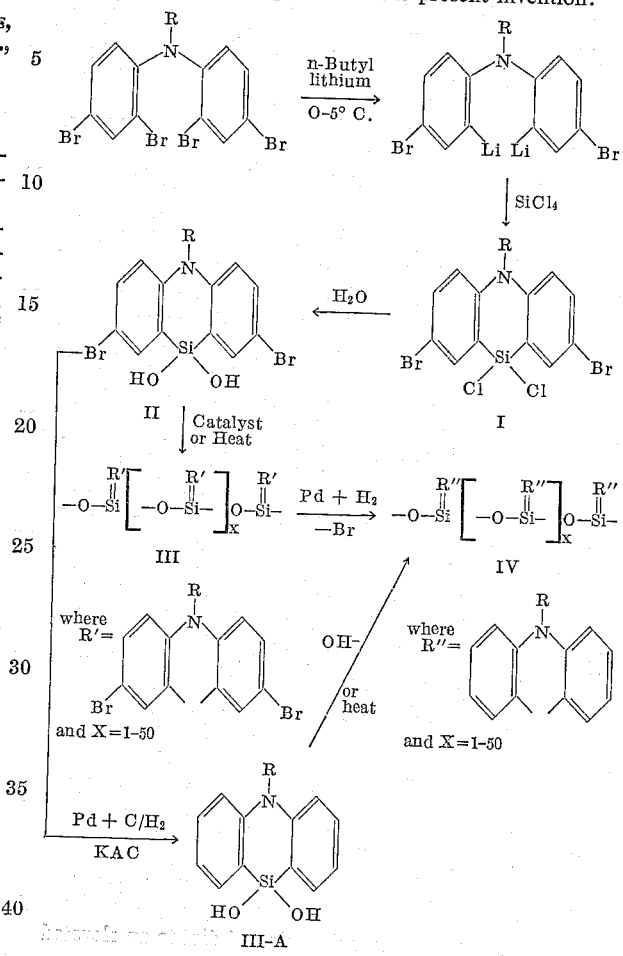

The starting compound 1 may be prepared in the following manner. Diphenylamine is brominated with either bromine or with a brominating agent such as N-bromoacetamide or N-bromosuccinimide or other reagent having a positive bromine atom, thereby forming 2,2',4,4'-tetrabromodiphenylamine. This compound is then alkylated to form 2,2',4,4'-tetrabromo-N-(lower alkyl)diphenylamine. Examples of the compounds thus formed are 2,2',4,4'-tetrabromo-N-methyldiphenylamine and 2,2',4,4'-tetrabromo-N-ethyldiphenylamine. The N-propyl and N-butyl homologs can be similarly prepared. A suitable method of making these compounds is to react 2,2',4,4'-tetrabromodiphenylamine with methyl lithium followed by a dialkyl sulfate such as dimethyl sulfate. For instance, 2,2',4,4'-tetrabromo-N-ethyldiphenylamine can be prepared by reacting diphenylamine with about four moles of bromine, and reacting the resulting 2,2',4,4'-tetrabromodiphenylamine successively with methyl lithium and diethyl sulfate, thereby forming 2,2',4,4'-tetrabromo-N-ethyldiphenylamine. Alternatively these compounds can be formed by direct alkylation with a lower alkyl bromide such as methyl bromide or ethyl bromide.

The 2,2',4,4'-tetrabromo-N-(lower alkyl)-diphenylamine is reacted with about two moles of a straight chain lower alkyl lithium containing from 2 to 10 carbon atoms, such as butyl lithium, ethyl lithium, propyl lithium, pentyl lithium, hexyl lithium, decyl lithium and the like, at a temperature not over about 10° C. and preferably about 0° C., in order to form a 4,4'-dibromo-2,2'-dilithio-N-(lower alkyl) diphenylamine. Under these conditions there is a highly selective replacement of the bromine atoms at the 2 and 2' positions with lithium, while the 4 and 4' bromine atoms are not attacked. Specific compounds which can be formed according to this reaction include 4,4'-dibromo-N-ethyl-2,2'-dilithio-diphenylamine and 4,4'-dibromo-2,2'-dilithio-N-methyl-diphenylamine. This reaction is carried out in an anhydrous organic solvent such as tetrahydrofuran. An inert atmosphere such as nitrogen or argon covers the reaction medium. It is essential to exclude both oxygen and water from the reaction in view of the reactivity of the alkyl lithium.

One equivalent of the 4,4'-dibromo-2,2'-dilithio-N-(lower alkyl) diphenylamine is then reacted with one equivalent of a compound having the formula, $SiX_4$, where X is a halogen having an atomic weight in the range of 35 to 80, such as silicon tetrachloride. The product of this reaction is a 2,8-dibromo-5-(lower alkyl)-10,10-dichlorophenazasiline.

This step may be illustrated specifically with reference to the reaction of 4,4'-dibromo-N-ethyl-2,2'-dilithio-diphenylamine with silicon tetrachloride to form 2,8-dibromo-5-ethyl-10,10-dichlorophenazasiline. The reaction is preferably conducted at room temperatures in an anhydrous organic solvent, such as ether.

The next step in the method is hydrolysis of the 2,8-dibromo-5-(lower alkyl)-10,10-dichloro-phenazasiline to form the corresponding diol or 2,8-dibromo-5-(lower alkyl)-10,10-dihydroxyphenazasiline. The hydrolysis is most conveniently carried out in an aqueous alcohol solution although other methods may be used as well.

Once the diol compound is obtained, it is polymerized to form the polymeric siloxane material having the Formula III in the flow sheet. The polymerization is preferably carried out in aqueous basic solution, suitably sodium hydroxide in ethanol, although other methods may be used as well. The bromine atoms on the rings then may be removed by reduction to form the corresponding unbrominated polymer.

In an alternative procedure, the dibromo-containing diol may be debrominated by hydrogenation, from which the desired unbrominated polymer is obtained by polymerization in an aqueous basic medium.

While it is preferred to polymerize the diol in solution, the polymerization step may also be effected by heating either the brominated or unbrominated diol to an elevated temperature, suitably up to 250° C., where a molecule of water is removed to form the polymer.

The invention will now be further illustrated by reference to the following more detailed examples.

PREPARATION OF MONOMER

Example I

An ethereal solution of n-butyl lithium, 182 ml., 0.2 mol (1.10 N solution) is added in thirty minutes to a stirred suspension of 51.2 g. (0.1 mol)) of 2,4,2',4' tetrabromodiphenyl ethylamine in 400 ml. of dry ether under a blanket of dry nitrogen. After one hour at 0° C., the 2,2' dilithio-4,4'-dibromo diphenyl ethylamine is added in thirty minutes to a solution of 34 g. (0.2 m.) of silicon tetrachloride in 200 ml. of diethyl ether held at 20° C. After holding the reaction mass at 20° C. for another thirty minutes, the mixture is stripped of all volatiles up to a pot temperature of 35° C. by applying a high vacuum. This leaves the residual 2,8-dibromo-5-ethyl-10,10-dichlorophenazasiline free of excess silicon tetrachloride.

A solution of 40.0 grams of 2,8-dibromo-5-ethyl-10,10-dichlorophenazasiline dissolved in 200 ml. of diethyl ether is added dropwise to a mixture of 15 ml. of toluene, 35 ml. of n-amyl alcohol, and 150 ml. of water with rapid stirring over a period of 30 minutes. After stirring rapidly over a period of one hour to complete the hydrolysis, the solid product is filtered and washed free of acids with water. The product is 2,8-dibromo-5-ethyl-10,10-dihydroxyphenazasiline.

PREPARATION OF POLYMERS

Example II 2,8-dibromo-5-ethyl-10,10-dihydroxyphenazasiline is dissolved in a boiling mixture of ethanol and benzene, and after adding two drops of aqueous caustic, heated for an hour and cooled. The brominated polysiloxane polymer precipitates. This is Product III on the flow sheet.

Example III

A hydrogenation bottle is loaded with 10.0 g. of bromine containing Product III dissolved in butanol-benzene mixture. To this is added a solution containing 3.0 g. of potassium acetate dissolved in 60 ml. of ethanol. The mixture is hydrogenated with 5 g. of palladium on charcoal catalyst at about 60° C. and 40 p.s.i.g. of hydrogen pressure. After several hours of reaction, the catalyst is filtered, and the cake washed with butanol-benzene mixture. The filtrate is carefully washed with water to remove inorganic salts and then stripped of solvents by vacuum distillation leaving a mixture of relatively halogen free polysiloxanes illustrated as Product IV in the flow sheet.

Example IV 2,8-dibromo-5-ethyl-10,10-dihydroxyphenazasiline, 10.0 g., is dissolved in 100 ml. of butanol-benzene mixture and placed in a hydrogenation bottle. After adding a solution of 3.0 g. of potassium acetate in 60 ml. of ethanol, and 5 g. of 5% palladium on carbon catalyst, the mixture is heated to 60° C. and hydrogenated under 40 p.s.i.g. of hydrogen pressure for several hours. After cooling and purging with nitrogen, the mixture is filtered free of catalyst, and the filter cake washed with butanol-benzene mixture. The filtrate is washed carefully with water to prevent emulsions from forming, and then stripped of solvents in vacuo to yield 5-ethyl-10,10-dihydroxyphenazasiline, Product III–A.

Example V

A drop of aqueous sodium hydroxide is added to a boiling solution of 5-ethyl-10,10-dihydroxyphenazasiline, 5 g., in 100 ml. of ethanol-benzene mixture. After refluxing at least one hour, the solvents are removed in vacuo, and the product carefully triturated with slightly acidified water to leach out the caustic, and then washed with distilled water. After vacuum dehydration, Product IV is obtained, redissolved in ethanol-benzene and fractionated by pouring into hexane to precipitate the polymer.

Example VI

Thermal dehydration of 5-ethyl-10,10-dihydroxyphenazasiline, 5.0 g., takes place by heating in a flask up to 250° C. with water distilling out as it is formed. A gummy mixture of polysiloxanes having a broad molecular weight range of products as indicated by Formula IV in the flow sheet is obtained.

The compounds of the present invention are useful as antioxidants in high temperature lubricants, particularly esters made from polyhydroxy alcohols and polybasic carboxylic acids. Suitable esters include neopentylglycol dipelargonate and trimethylol propane tricaproate. The addition of a phenazasiline derivative to such esters is necessary to prevent oxidation at the high temperature at which these lubricants function.

While the invention has been described with particular reference to certain embodiments thereof, it will be apparent to those skilled in the art that other modifications within the scope of the invention may be made.

What is claimed is:
1. Polymeric phenazasilines having the formula:

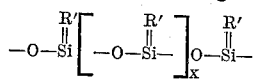

where R'=

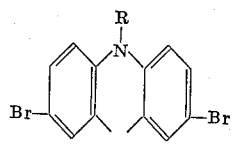

X=1–50, and R is lower alkyl.

2. Polymeric phenazasilines having the formula:

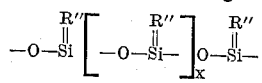

where R''=

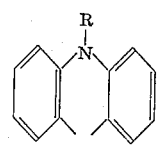

X=1–50 and R is lower alkyl.

3. Phenazasiline compounds having the formula:

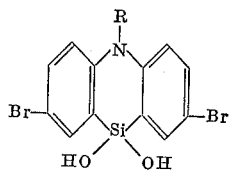

where R is lower alkyl.

4. Phenazasiline compounds having the formula:

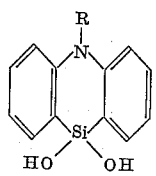

where R is lower alkyl.

5. A method of making polymeric phenazasilines which comprises polymerizing a compound having the formula:

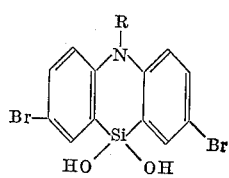

where R is lower alkyl, to form a siloxane polymer having the formula:

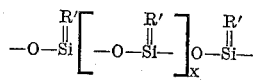

where R'=

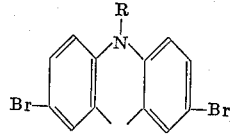

and X=1–50 in a polymerizing medium consisting essentially of aqueous sodium hydroxide in ethanol.

6. A method of making polymeric phenazasilines which comprises hydrogenating a compound having the formula:

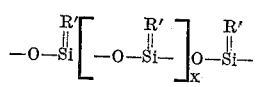

where R'=

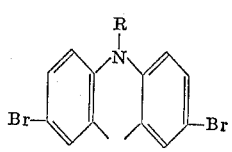

R is lower alkyl and X=1–50, to form a compound having the formula:

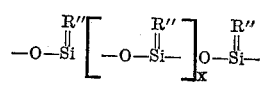

where R''=

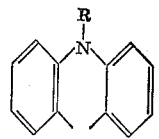

and R and X are as previously defined.

References Cited in the file of this patent

UNITED STATES PATENTS 3,065,251    Jones et al.    Nov. 20, 1962
3,069,444    Wasserman et al.    Dec. 18, 1962

OTHER REFERENCES

Gilman et al.: "Jour. Organic Chemistry," vol. 26, June 1961, pp 2013–7.